(12) United States Patent
Förster

(10) Patent No.: US 6,619,445 B2
(45) Date of Patent: Sep. 16, 2003

(54) TELESCOPIC VIBRATION DAMPER

(75) Inventor: Andreas Förster, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/047,243

(22) Filed: Jan. 14, 2002

(65) Prior Publication Data

US 2002/0112931 A1 Aug. 22, 2002

(30) Foreign Application Priority Data

Jan. 12, 2001 (DE) .......................................... 101 01 177

(51) Int. Cl.$^7$ ................................................. F16F 9/00
(52) U.S. Cl. ..................... 188/315; 188/297; 267/64.26
(58) Field of Search ................................ 188/297, 315, 188/322.14, 322.19, 313, 314, 317, 322.15, 322.22, 269; 267/64.26

(56) References Cited

U.S. PATENT DOCUMENTS

| 1,780,659 | A | | 11/1930 | Wallace |
| 1,918,697 | A | * | 7/1933 | Gruss ........................ 267/64.25 |
| 3,041,061 | A | | 6/1962 | Funkhouser |
| 3,363,894 | A | | 1/1968 | Hill |
| 4,235,317 | A | * | 11/1980 | Maciejewski ............... 188/268 |
| 4,405,119 | A | * | 9/1983 | Masclet et al. .......... 267/64.22 |
| 4,973,854 | A | * | 11/1990 | Hummel ................... 267/64.26 |
| 5,263,559 | A | * | 11/1993 | Mettner .................... 188/266.5 |
| 5,529,519 | A | * | 6/1996 | Nakamura et al. ............. 440/61 |
| 5,593,007 | A | * | 1/1997 | Siltanen ....................... 188/269 |
| 6,161,821 | A | * | 12/2000 | Leno et al. ............... 267/64.24 |

FOREIGN PATENT DOCUMENTS

| DE | 1 995 279 | | 10/1968 |
| EP | 0 023 282 | * | 2/1981 |
| EP | 0 267 543 | | 5/1988 |
| FR | 2 530 763 | | 1/1984 |

* cited by examiner

*Primary Examiner*—Douglas C. Butler
*Assistant Examiner*—Bradley T King
(74) *Attorney, Agent, or Firm*—Cohen, Pontani, Lieberman & Pavane

(57) ABSTRACT

A telescopic vibration damper, comprising a pressure tube filled with a damping medium, in which a piston rod is arranged such that it can move axially, the pressure tube being axially displaceably guided in an intermediate tube. An annular chamber between the pressure tube and the intermediate tube is likewise filled with the damping medium, there being a flow connection between the pressure tube and the annular chamber, and a compensating chamber accommodates the displaced volume of the components that can be telescoped toward one another. The annular chamber formed by the intermediate tube and the pressure tube, and the pressure tube, are hydraulically separated from the compensating chamber.

10 Claims, 2 Drawing Sheets

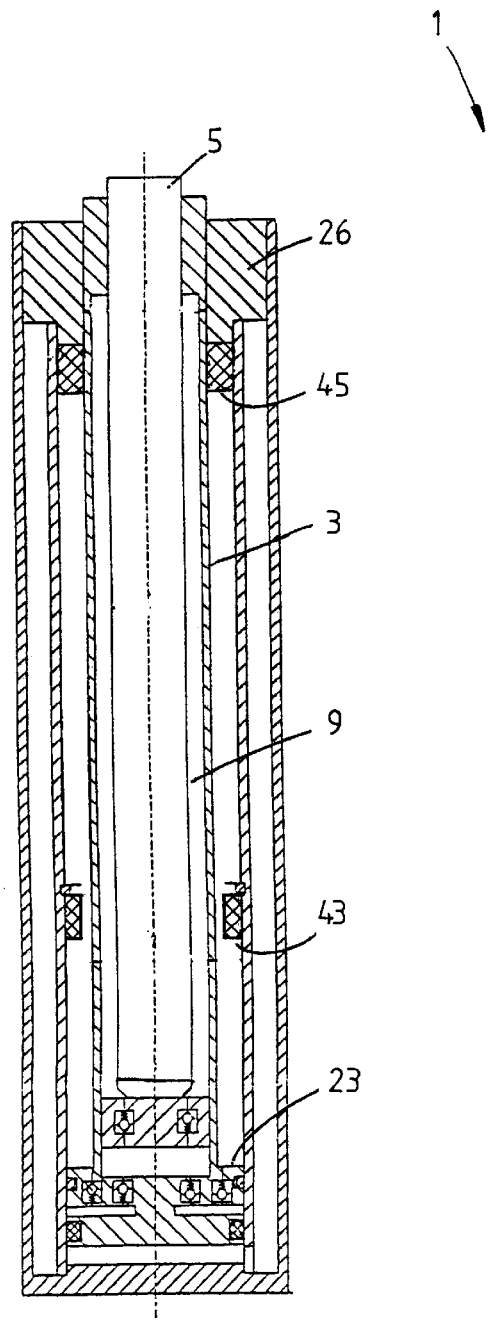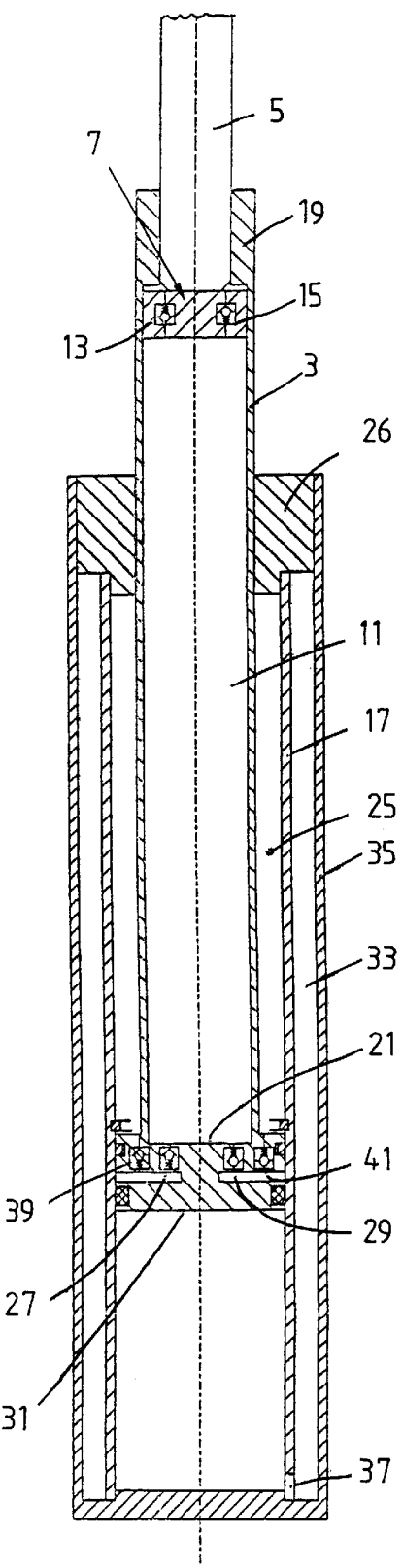
Fig.1
Fig.2

TELESCOPIC VIBRATION DAMPER

BACKGROUND OF THE INVENTION

1. Field of the Invention

The invention relates to a telescopic vibration damper including a pressure tube filled with a damping medium, a piston rod arranged to move axially in the pressure tube, an intermediate tube in which the pressure tube is arranged to move axially, an annular chamber between the pressure tube and the intermediate tube, a flow connection between the pressure tube and the annular chamber, and a compensating chamber which accommodates the displaced volume of the components that can be telescoped toward one another.

2. Description of the Related Art

In conventional vibration dampers, the stroke length of the piston rod is determined by the length of the pressure tube minus a dead length for a bottom valve or a compensating chamber. In particular in the case of automobiles, the trunk should not be restricted by a dome for the vibration damper. Vibration dampers installed horizontally are often found in combination with unfavorable axle constructions.

DE-U 1 995 279 discloses a telescopic vibration damper which has a pressure tube in which a piston rod can be displaced axially. The pressure tube can be displaced axially in relation to an intermediate cylinder which, with a container tube, forms a compensating chamber. Present on the pressure tube, in the pulling and compressing directions, are stop means which, beginning at the maximum retraction or extension position of the piston in the pressure tube, carry along the intermediate cylinder with a form fit during the further retraction or extension movement, and therefore a stroke length is achieved which is considerably greater than that of a conventional vibration damper.

One drawback of this specific vibration damper can be seen in the fact that, in a central stroke range, there is no positive assignment between the piston rod, the pressure tube and the intermediate cylinder. Depending on the frictional relationships, an indeterminate stroke position combination of the aforementioned subassemblies is established. It could be the case, for example, that the piston rod has already reached the end position in the pressure tube, and the pressure tube is still retracted to the maximum in the intermediate cylinder. On the other hand, the piston rod can still be retracted to the maximum in the pressure tube, but the pressure tube can already have reached its maximum extended position in relation to the intermediate cylinder.

By means of the damping valve in the vibration damper, the extending or retracting damping medium volume is always displaced. If it is not determined which of the telescopic elements retracts, then nor is it determined what damping force is effective in relation to a specific stroke position.

SUMMARY OF THE INVENTION

It is an object of the present invention to implement a telescopic vibration damper which in every stroke position ensures an unambiguous stroke position association between the individual telescopic elements.

According to the invention, the object is achieved by the annular chamber formed by the intermediate tube and the pressure tube, and the pressure tube being separated hydraulically from the compensating chamber.

The substantial advantage of the invention is that there is a hydraulically controlled positive relationship between the movements of the piston rod and of the pressure tube, so that the volumes of the damping medium flowing through the damping valves are also predefined.

In this case, provision is made for the pressure tube to have a base at one end, in which a bottom valve that acts in the retraction direction of the piston rod is arranged. In the retraction direction, a damping valve and the bottom valve can be effective on one piston.

In a further advantageous refinement, a damping valve is arranged in the flow path from the annular chamber to the pressure tube and, during an extending movement of the pressure tube, generates a damping force. An extending movement of the pressure tube is connected to an extending movement of the piston rod, as a result of the principle, it being possible for the piston rod to have a piston with a damping valve. During an extending movement of the piston, a working chamber on the piston-rod side is compressed, the pressure being supported on a piston-rod guide connected to the pressure tube. However, the compressive force is also transmitted to the damping medium in the annular chamber between the intermediate tube and the pressure tube, the damping medium subsequently flowing into the working chamber remote from the piston rod. The damping valve achieves an additional damping force which is superimposed additively on that from the damping valve in the piston. The result, in relation to the extension speed of the piston rod, is a lower pressure difference across the respective damping valves, and therefore lower loading on the damping valves.

In order to have the damping valves become effective in a specific way, in each case a nonreturn valve is connected in parallel with the damping valve and the bottom valve.

According to an advantageous embodiment, the base accommodates the bottom valve and the damping valve.

It has proven to be advantageous if the bottom valve and the nonreturn valve acting from the pressure tube toward the annular chamber are arranged in the base, and the damping valve from the annular chamber to the pressure tube is arranged in a piston section outside the pressure tube.

Furthermore, the nonreturn valve connected in parallel with the damping valve can cooperate with the piston section. Therefore, the total space needed by the piston section is utilized optimally by the valves.

For example, in one design variant, a clamping bolt for at least one valve disk belonging to the bottom valve is fixed in the base, the clamping bolt fixing a clamping means of at least one valve disk for the damping valve that acts from the annular chamber toward the pressure tube. The bottom valve and the damping valve may be biased separately.

With regard to a progressive damping force characteristic, a pull stop spring element is arranged in the pressure tube.

Alternatively or additionally, the outward springing movement of the pressure tube is limited by a pull stop.

In addition, provision can be made for a separating piston from the pressure tube to the compensating chamber to form a part of the base in the pressure tube. With this measure, a very stable separating piston is achieved, which is of interest in particular with regard to production safety, since in the case of a separate component, care must always be taken that it is not forgotten during assembly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a basic illustration of the telescopic vibration damper in the retracted end position;

FIG. 2 shows the telescopic vibration damper in the extended end position; and

DETAILED DESCRIPTION OF THE PRESENTLY PREFERRED EMBODIMENTS

Figure 3:
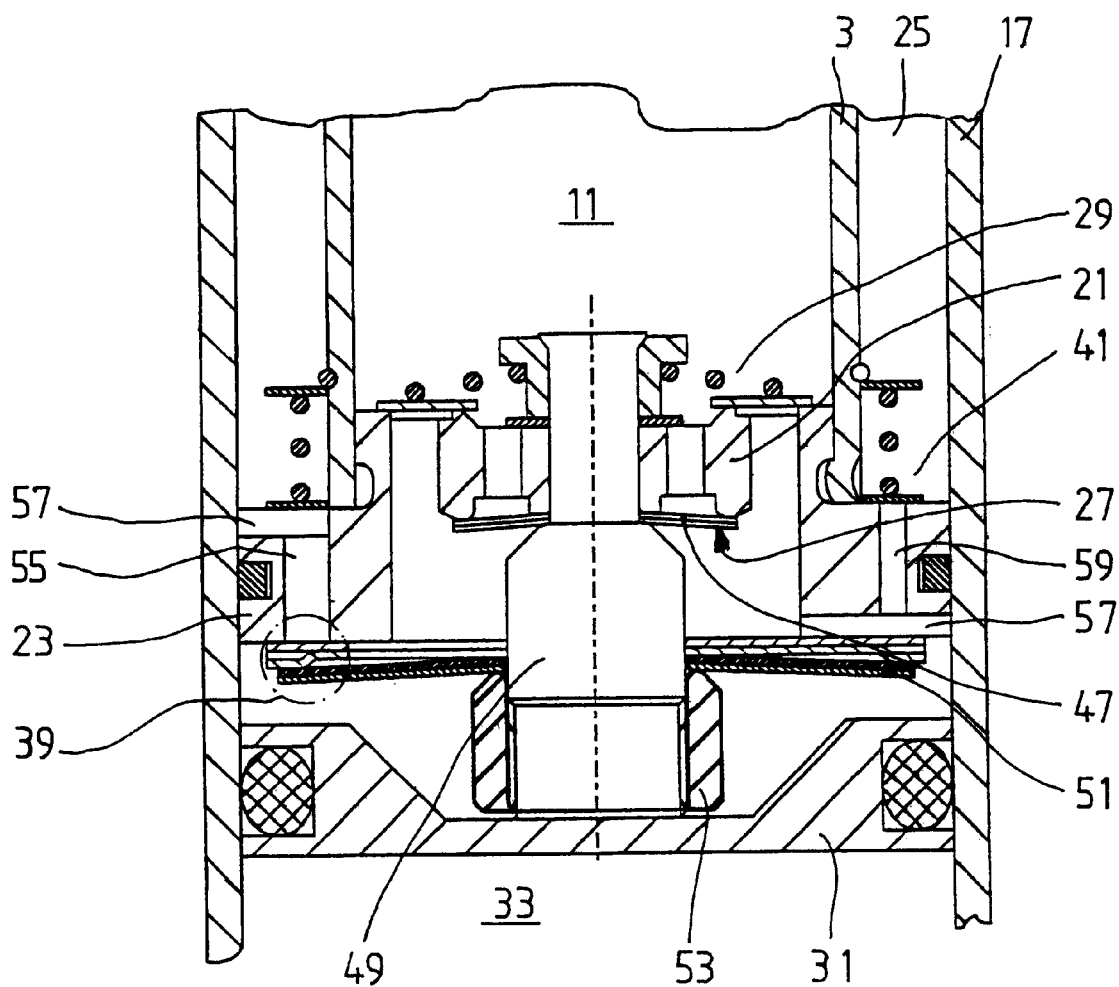
FIG. 3 shows the base with bottom valve as an individual part.

FIGS. 1 and 2 show a telescopic vibration damper 1, which has a pressure tube 3 in which a piston rod 5 with a piston 7 is arranged such that it can move axially, and subdivides the pressure tube into a working chamber 9 on the piston-rod side and a working chamber 11 remote from the piston rod. Apart from piston valves 13; 15 for the retraction direction and for the extension direction, the working chambers are separated hydraulically. The pressure tube 3 is axially movably guided in an intermediate tube 17, a piston-rod guide 19 for the piston rod being firmly connected to the pressure tube. FIGS. 1 and 2 are basic sketches, so that for reasons of clarity the detailed representation of the piston-rod guide with sealing elements and so on has been dispensed with.

Fixed at the end of the pressure tube is a base 21, which has a piston section 23 located radially outside the pressure tube 3 and guided in the intermediate tube 17. The intermediate tube, the pressure tube and the piston section determine an annular chamber 25, which is closed off at the end by a pressure-tube guide 26. The entire pressure tube and the entire annular chamber are filled with an incompressible damping medium. For the flow of damping medium from the working chamber 11 remote from the piston rod into the annular chamber 25, there is a bottom valve 27. Connected in parallel with the bottom valve 27 is a nonreturn valve 29 which, when the bottom valve is opened, assumes the closed position.

A separating piston 31 closes off the working chambers 9; 11 and the annular chamber 25 from a compensating chamber 33. The compensating chamber is filled with a compressed gas and extends between a container 35 and the intermediate tube 17. Provided at the lower end of the intermediate tube is a connecting opening 37, which connects the proportion of the volume of the compensating chamber in the intermediate tube to the proportion of the volume in the container.

Further provided in the piston section are a damping valve 39 for flow of the damping medium from the annular chamber into the working chamber 11 remote from the piston rod, and a nonreturn valve 41 connected in parallel with the damping valve 39. These two valves are to be used optionally and are in no way absolutely necessary for the ability of the telescopic vibration damper to function.

During a retracting movement of the piston rod 5, for example starting from the piston-rod position according to FIG. 2, the retracting volume of the piston is displaced from the working chamber 11 remote from the piston rod. In a way corresponding to the increasing annular chamber in the working chamber 9, damping medium flows through the piston valve 13 into the working chamber 9 on the side of the piston rod, a damping force being generated. The proportion of the volume corresponding to the volume of the retracting piston rod flows through the bottom valve 27 and the nonreturn valve 41 into the completely filled annular chamber 25. In the event of a further supply of damping medium, the oil column in the annular chamber 25 is enlarged, as a result of which the pressure tube 3 retracts further into the intermediate tube 17. Depending on the cross section $A_k$ of the piston rod in relation to the $A_{Ring}$ of the annular chamber, the pressure tube and piston rod move relative to each other, but jointly in the intermediate tube 17 in the direction of the compensating chamber. The entire volume in the annular chamber 25 and in the pressure tube 3 remains in this complex of the telescopic vibration damper. The separating piston 31 prevents any outflow into the compensating chamber 33. The pressure in the compensating chamber must be sufficiently high for the base 21 to be supported on the gas cushion, in order that a damping force can be established on the piston and on the bottom valve 27. It is also possible to provide for the piston valve 13 to be designed as a simple nonreturn valve, which does not produce any damping force.

During an extending movement of the piston rod, for example from the maximum retracted piston-rod position according to FIG. 1, the damping medium in the piston-rod side working chamber 9 is compressed and displaced by the piston valve 15 into the working chamber 11 remote from the piston rod. On the underside of the piston-rod guide 19 a compressive force is built up, which is transmitted to the pressure tube 3 and has the effect of moving the pressure tube. Consequently, the enclosed volume in the annular chamber 25 is likewise compressed, since the damping-medium column is supported on the pressure-tube guide 26. The damping medium displaced from the annular chamber by the piston section 23 flows through the damping valve 39 and the opened nonreturn valve 29 in the base 21 into the working chamber 11 remote from the piston rod. Therefore, the total damping force of the telescopic vibration damper in the extending direction results from the sum of the damping forces in the piston and in the damping valve 39. Overall, the pressure drop across the damping valves involved can be reduced as a result. This measure has the advantage that the components of the damping valve can be of weaker design and, for example, the risk of leaks at seals is minimized. Furthermore, the outward thrust force on account of the pressure in the compensating chamber 33 is reduced. The damping force of the damping valve 39 counteracts the outward thrust force.

In addition, alternatively or in combination, a sprung pull stop 43; 45 can be arranged in the pressure tube and in the annular chamber. The forces from the pull stop may also be coordinated in such a way that one of the pull stops begins to act somewhat earlier than the other. It is also possible to design one pull stop with a hydraulic action and the other pull stop with a pure spring force. As a result, simpler constructions based on a hydraulic-mechanical pull stop may be implemented.

FIG. 3 shows a practical refinement of the base 21. The bottom valve 27 and the nonreturn valve 29 are arranged in a central area in relation to the pressure tube 3. The nonreturn valve 29 has a valve disk known per se that is biased by a closing spring. In the case of the bottom valve 27, at least one valve disk 47 is used which is biased against the base 21 by a clamping bolt 49. The clamping bolt in turn positions valve disks 51 for the damping valve 39, one clamping nut 53 fixing the valve disks 51 axially.

In this enlarged illustration, the nonreturn valve 41 is likewise designed in the form of a simple nonreturn disk in conjunction with a closing spring, the valve disk bearing on the piston section 23. For the flow of the damping medium out of the working chamber 11 remote from the piston rod, through the damping valve 27 into the piston section 23 and onward into the annular chamber 25, passage ducts 59 are available, which have bypass connections 57 in the opening direction in relation to the nonreturn valve 41. For the flow of the damping medium out of the annular chamber 25, through the damping valve 39 into the working chamber 11 remote from the piston rod, a bypass connection 57 is likewise available, in order to bypass the nonreturn valve 41 hydraulically. Therefore, the passage ducts 55; 59 can be arranged on a joint partial circle and make beneficial use of the overall space of the annular chamber 25 or of the piston section 23 which, under certain circumstances, may be small in the radial direction.

As distinct from the design according to FIGS. 1 and 2, the separating piston 31 in FIG. 3 represents a separate component. On account of the pressure in the compensating chamber, although the separating piston will bear permanently on the base 21 or, in this case, on the lower end of the clamping bolt, any transverse forces which may act on the pressure tube will not be transmitted to the separating piston.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A telescopic vibration damper comprising
   a pressure tube enclosing a working chamber filled with a damping medium and having a base,
   a piston rod arranged to move axially in said pressure tube, said piston rod carrying a piston which moves in said working chamber,
   an intermediate tube in which said pressure tube is arranged to move axially,
   an annular chamber between said pressure tube and said intermediate tube, said annular chamber being filled with said damping medium,
   a flow connection between the working chamber and the annular chamber, said flow connection comprising a bottom valve in said base, said bottom valve opening when said piston rod moves toward said base,
   a separating piston fixed to said base of said pressure tube and engaging said intermediate tube, said separating piston displacing a volume as said pressure tube moves axially in said intermediate tube, and
   a compensating chamber accommodating the volume displaced by said separating piston as said pressure tube moves axially in said intermediate tube, the working chamber and the annular chamber being hydraulically separated from the compensating chamber by the separating piston.

2. A telescopic vibration damper as in claim 1 further comprising a damping valve in said flow connection between said working chamber and said annular chamber, said damping valve generating a damping force when said piston moves away from said base so that movement of said damping medium from said annular chamber into said working chamber is damped.

3. A telescopic vibration damper as in claim 2 further comprising a check valve arranged in parallel with the bottom valve, and a check valve arranged in parallel with the damping valve.

4. A telescopic vibration damper as in claim 2 wherein said damping valve is in said base.

5. A telescopic vibration damper as in claim 3 wherein the base comprises a piston section external to said pressure tube, said bottom valve and said check valve parallel to said bottom valve being arranged inside of said piston section of said base, said damping valve being arranged in said piston section of said base.

6. A telescopic vibration damper as in claim 5 wherein said check valve in parallel with said damping valve is located in said piston section of said base.

7. A telescopic vibration damper as in claim 1 further comprising a pull-stop arranged in the pressure tube.

8. A telescopic vibration damper as in claim 1 further comprising a pull stop arranged in the annular chamber.

9. A telescopic vibration damper as in claim 1 wherein said compensating chamber contains a gas.

10. A telescopic vibration damper as in claim 1 wherein said damping medium is a hydraulic fluid.

* * * * *